No. 610,796. Patented Sept. 13, 1898.
J. H. BOWMAN.
BICYCLE AIR BRAKE.
(Application filed Sept. 13, 1897.)

(No Model.)

Witnesses
Jas. H. McCathran
V. B. Hillyard

Inventor
John H. Bowman
By his Attorneys,
C. A. Snow & Co.

UNITED STATES PATENT OFFICE.

JOHN H. BOWMAN, OF HAZLETON, PENNSYLVANIA, ASSIGNOR OF ONE-THIRD TO CHARLES L. ALLEN, OF BEAVER MEADOW, PENNSYLVANIA.

BICYCLE AIR-BRAKE.

SPECIFICATION forming part of Letters Patent No. 610,796, dated September 13, 1898.

Application filed September 13, 1897. Serial No. 651,519. (No model.)

*To all whom it may concern:*

Be it known that I, JOHN H. BOWMAN, a citizen of the United States, residing at Hazleton, in the county of Luzerne and State of Pennsylvania, have invented a new and useful Bicycle Air-Brake, of which the following is a specification.

This invention provides a pneumatic brake for use in connection with bicycles, tricycles, and road-machines of like character and which is easy of operation, positive in action, and responsive to the means employed for charging the brake-cylinder whereby the brake is set.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
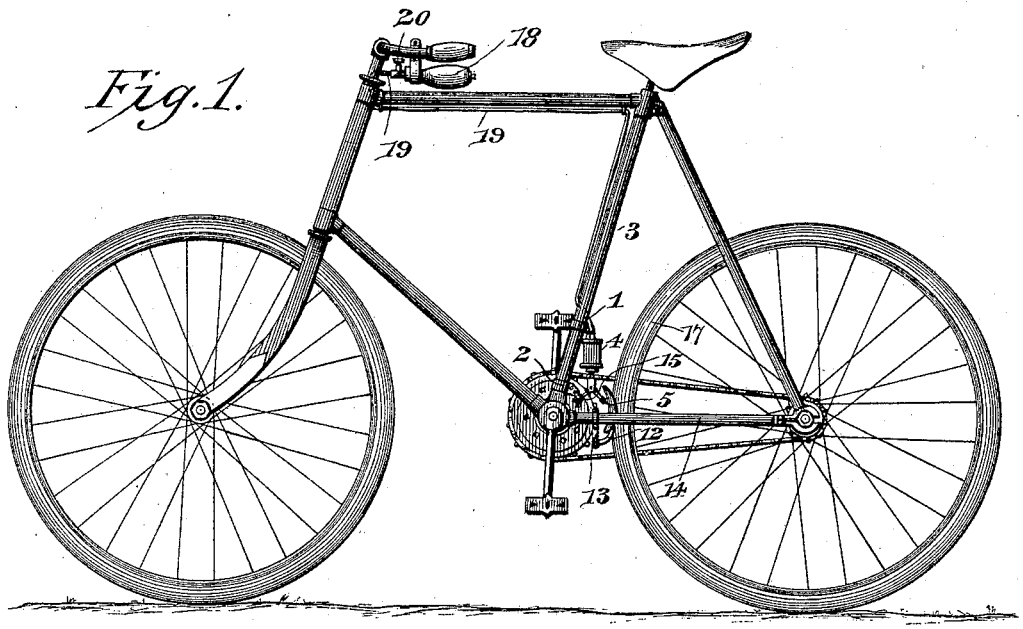
Figure 2:
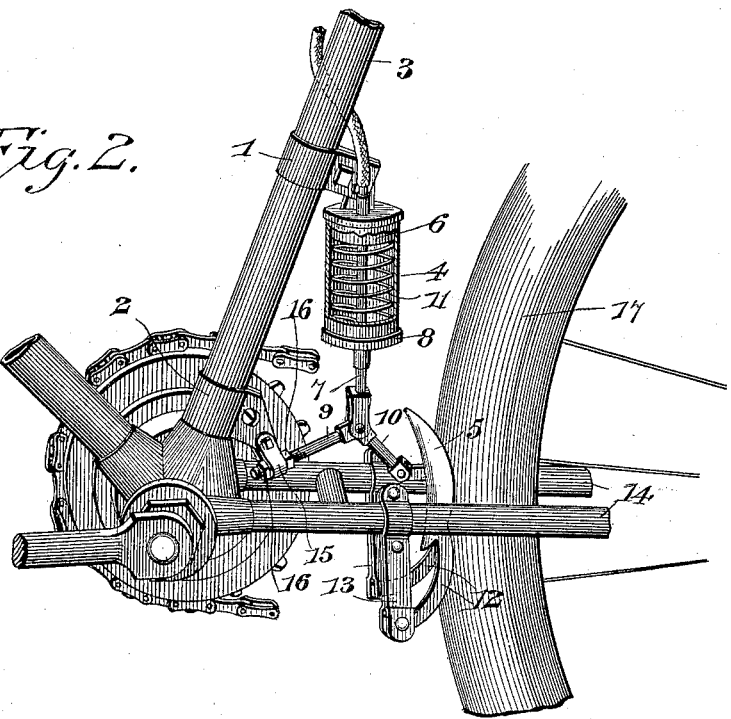

Figure 1 is a detail view of a bicycle of ordinary construction, showing the improved brake mechanism applied thereto. Fig. 2 is a detail view in perspective of a fragmentary part of the bicycle, showing the brake and connections on a larger scale.

Corresponding and like parts are referred to in the following description and indicated in both views of the drawings by the same reference characters.

Clips 1 and 2 of ordinary construction are applied to the diagonal or seat-post tube 3 of the bicycle and form mountings for parts of the brake mechanism, as will appear more fully hereinafter. The brake-cylinder 4 is suspended from the clip 1 and is free to move at its lower end to adapt itself to the relative position of the connections between the brake-shoe 5 and clip 2. A piston 6 is located within the cylinder 4, and its stem 7 projects through a gland or nipple provided centrally of the cap 8, closing the lower end of the cylinder, and has connection with toggle-levers 9 and 10. A spring 11 is located within the cylinder 4, and is confined between the cap 8 and piston 6 and normally holds the piston at the upper end of the cylinder and the brake out of action.

The brake-shoe 5 may be of any formation, and, as shown, is of the spoon variety and has pivotal connection with the rear end of the toggle-lever 10, and is formed with curved arms 12, which have pivotal connection at their lower ends with hangers 13, clipped to the side bars 14 of the rear fork. The same pivot connecting the toggle-levers 9 and 10 is the means for attaching the lower end of the stem 7 therewith, whereby the power for operating the toggle-levers is applied to the best possible advantage. A clip 15 has pivotal connection with the clip 2, and the front end of the toggle-lever 9 has adjustable connection therewith by means of set-nuts 16, applied to its forward threaded end and coming upon opposite sides of the pivotal clip 15. By a proper adjustment of the set-nuts 16 the relative distance between the brake-shoe 5 and the rear or drive wheel 17 may be varied as desired. The brake-shoe, it will be observed, is located between the crank-hanger and rear wheel and operates between the side bars of the rear fork and is suspended or supported thereby by means of the curved arms 12 and hangers 13, the latter having adjustable connection with the fork sides 14, whereby provision is had for adapting the brake to the particular style of machine to which it is fitted.

As will be readily understood, the brake is set by introducing air under pressure into the upper end of the cylinder 4, which causes the piston to move downward against the tension of the spring 11, thereby straightening the toggle-levers 9 and 10 and applying the brake. Upon relieving the cylinder 4 of the air the spring 11, regaining itself, will move the piston upward and unset the brake, as will be readily comprehended. Any suitable means may be employed for charging the cylinder with air under pressure to apply the brake, and, as shown, a bulb 18 is used, a rubber or flexible tube 19 connecting it with a nipple or short tube applied to the upper end of the cylinder. This bulb is located within convenient reach and is clipped to the handle-bar to be compressed when it is required to apply the brake and is supplied with a relief-valve 20, which when operated admits of the air escaping from the upper portion of the cylinder 4 by the action of the spring 11 returning to a normal position and moving the piston 6 to a starting position within the cylinder. The spring 11 unsets the brake, returns the piston to a normal position, and exhausts the cylinder in the manner set forth.

Having thus described the invention, what is claimed as new is—

1. In a bicycle or like machine, the combination of a brake-cylinder having pivotal connections and suspended from the diagonal or seat-post tube, toggle-levers having connection with the stem of the piston, means for connecting one terminal of a toggle-lever with the machine-frame, a brake-shoe applied to the terminal of the other toggle-lever, and means for charging the cylinder with air under pressure to set the brake, substantially as set forth.

2. In a pneumatic brake for bicycles and the like, the combination of a brake-cylinder, means for pivotally connecting the brake-cylinder with the machine-frame, toggle-levers having connection with the stem of the piston, means for pivotally and adjustably connecting one of the toggle-levers with the machine-frame, a brake-shoe applied to the other toggle-lever, and means for charging the brake-cylinder with air under pressure to set the brake, substantially as described.

3. In a pneumatic brake for bicycles and similar vehicles, the combination with a brake-cylinder, means for attaching the brake-cylinder to a machine-frame, toggle-levers having connection with the stem of the brake-cylinder piston, means for adjustably connecting one of the toggle-levers with the machine-frame, a brake-shoe connected with the other toggle-lever, and means for charging the brake-cylinder with air under pressure to operate the brake-shoe, substantially as specified.

4. In a brake for bicycles and the like, the combination of a brake-cylinder pivotally connected with the machine-frame, toggle-levers having connection with the stem of the piston, a clip having pivotal connection with a part applied to the machine-frame, means for adjustably connecting a toggle-lever with the pivotal clip, a brake-shoe having connection with the other toggle-lever, hangers supporting the brake-shoe and having adjustable connection with the fork sides, and means for charging the cylinder with air under pressure to set the brake, substantially as described.

5. The herein-described pneumatic brake mechanism for bicycles and the like, comprising clips, a brake-cylinder having pivotal connection with one of the clips, toggle-levers having pivotal and adjustable connection with the other clip and having the stem of the piston attached thereto, a spring located within the brake-cylinder and acting upon the piston to hold the brake out of action, a brake-shoe having connection with the toggle-levers and provided with curved arms, and hangers having pivotal connection with the curved arms and provided with clips, substantially as shown for the purpose specified.

In testimony that I claim the foregoing as my own I have hereto affixed my signature in the presence of two witnesses.

JOHN H. BOWMAN.

Witnesses:
W. T. SHERMAN,
SYLVESTER ENGLE, Jr.